United States Patent [19]

Koyama

[11] Patent Number: 5,592,570

[45] Date of Patent: Jan. 7, 1997

[54] IMAGE PROCESSING METHOD

[75] Inventor: Hiroo Koyama, Kaisei-machi, Japan

[73] Assignee: Fuji Photo Film Co., Ltd., Kanagawa, Japan

[21] Appl. No.: 348,956

[22] Filed: Nov. 28, 1994

Related U.S. Application Data

[63] Continuation of Ser. No. 136,987, Oct. 18, 1993, abandoned, which is a continuation of Ser. No. 875,218, Apr. 28, 1992, abandoned, which is a continuation of Ser. No. 671,314, Mar. 19, 1991, abandoned.

[30] Foreign Application Priority Data

Mar. 23, 1990  [JP]  Japan ........................................ 2-73943
Apr. 5, 1990  [JP]  Japan ........................................ 2-91161

[51] Int. Cl.$^6$ ............................................. G06K 9/40
[52] U.S. Cl. ............................................. 382/254; 382/258
[58] Field of Search ........................................ 382/173, 254, 382/758; 345/137, 139, 143, 144; 395/198, 199

[56] References Cited

U.S. PATENT DOCUMENTS

| | | | |
|---|---|---|---|
| 4,010,446 | 3/1977 | Kawa | 382/55 |
| 4,204,232 | 5/1980 | Mizuno | 382/55 |
| 4,539,704 | 9/1985 | Pastor | 382/55 |
| 4,748,443 | 5/1988 | Uehara et al. | 382/55 |
| 4,837,847 | 6/1989 | Shirasaka et al. | 382/55 |

*Primary Examiner*—Jose L. Couso
*Attorney, Agent, or Firm*—Sughrue, Mion, Zinn, Macpeak & Seas

[57] ABSTRACT

In this invention, an original image is read to be formed as a tour bit map, and the bit map is read out for each plurality of picture elements. Then, in the position to which the aforementioned unit plurality of picture elements corresponds on the original image, a predetermined bit map data is to be written by a logical sum. If the operation is indicated as a shadowing process, a bit map of a predetermined oblique line for a shadow designated by a direction and a length is to be written. The aforementioned operation is carried out for every plurality of picture elements on the contour bit map so as to thicken or shadow the original image at a high speed. When the method of this invention is applied as to a large size region, since the work area for the reservation of the contour data becomes larger to exhibit less effectiveness of the space usage, the processing area is designed to be divided, if required, to be processed. In such a division method, it is required to set up as work areas a reservation area for keeping the contour bit map and a writing-in region for writing in the synthetic unit data in the use of the logical sum. Providing the latter mentioned writing-in region makes it possible to save a clipping treatment, and also give an advantage for effecting the thinning operation.

12 Claims, 15 Drawing Sheets

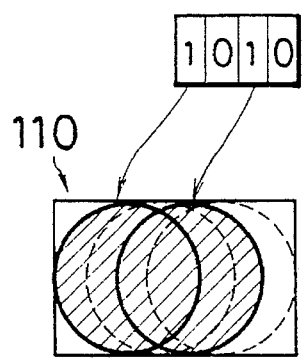
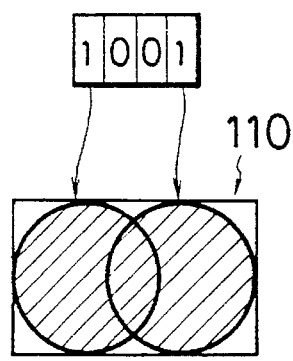
FIG. 3A  FIG. 3B
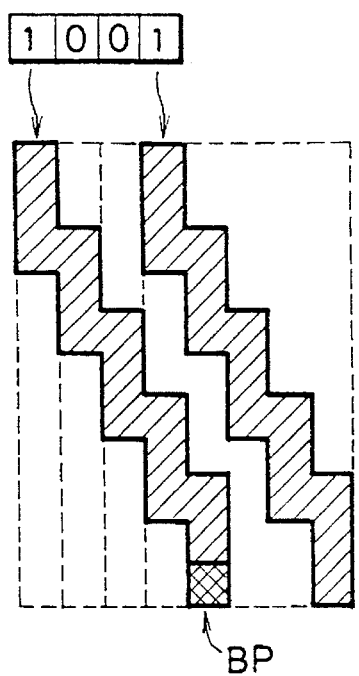
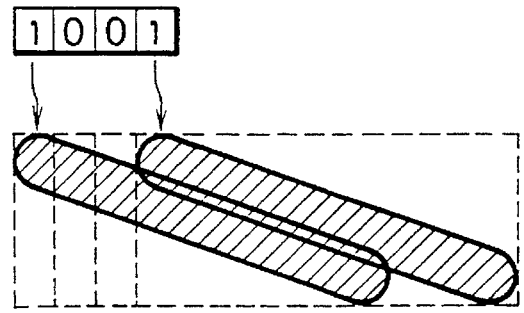
FIG. 3C  FIG. 3D

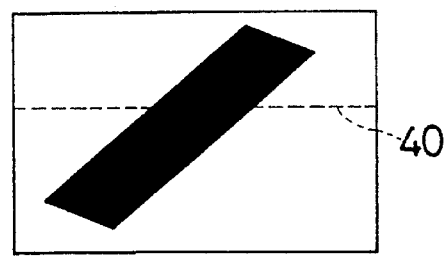
F I G. 14A
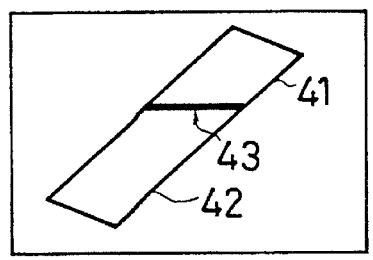   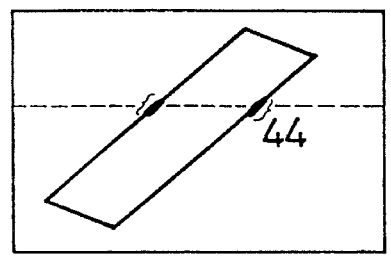
F I G. 14B          F I G. 14C
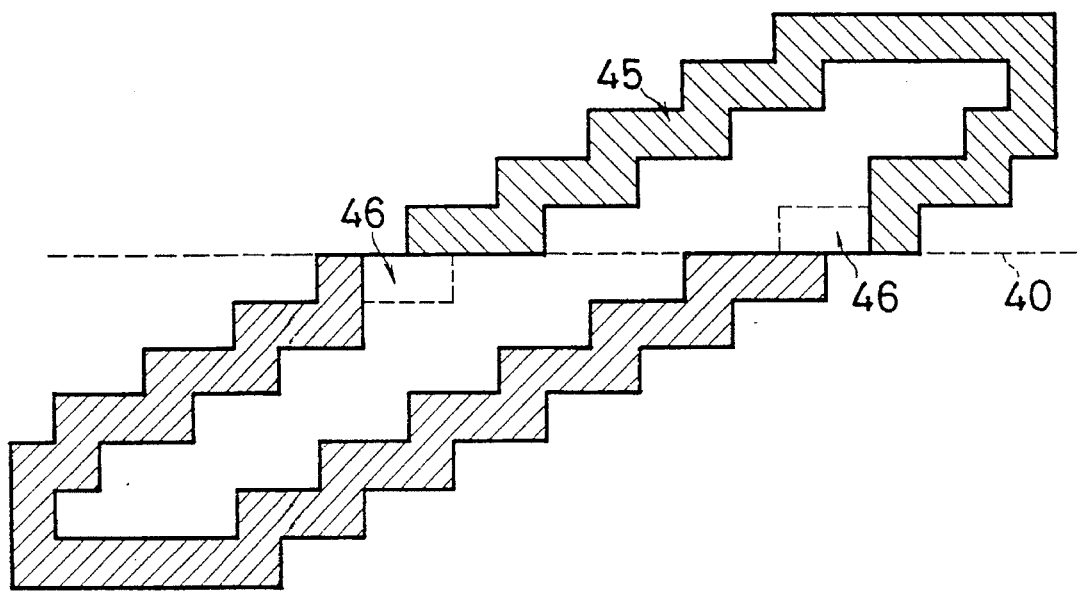
F I G. 15

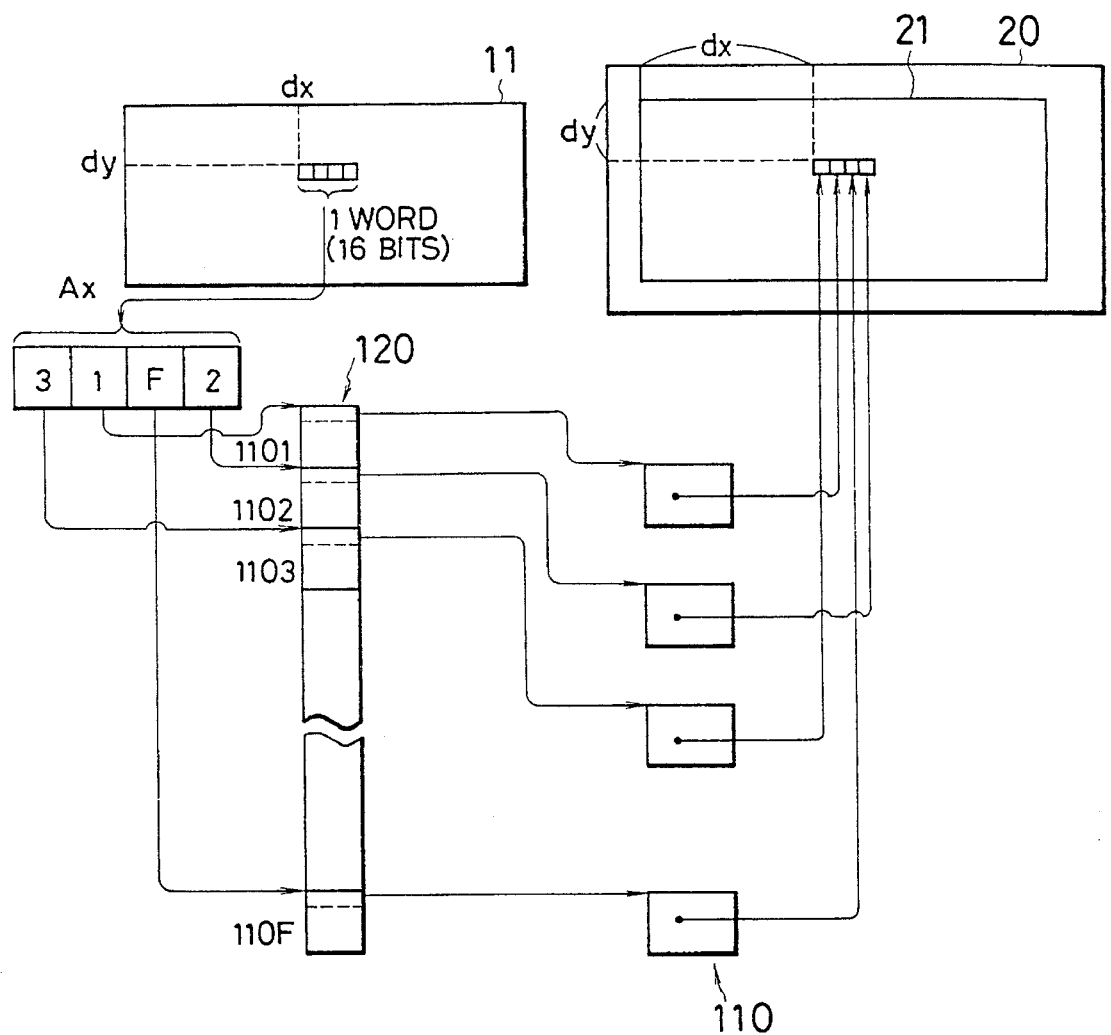
F I G. 20

1

IMAGE PROCESSING METHOD

This is a Continuation of application Ser. No. 08/136,987 filed Oct. 18, 1993 now abandoned, which is a continuation of U.S. application Ser. No. 07/875,218 filed on Apr. 28, 1992 now abandoned, which is a continuation of U.S. application Ser. No. 07/671,314 filed on Mar.19, 1991 now abandoned.

BACKGROUND OF THE INVENTION

1. Field of the Invention

This invention relates to an image processing method of making a print plate. In particular, the present invention is useful for making characters (bit map images) boldfaced (or lightfaced) or shadowed, effectively and at a high speed.

2. Description of the Proir Art

The conventional method of image processing of variegated characters is in which a dot-decomposed character data is subjected to variegation processing so as to obtain a variegated character (such as outlined characters, shadowed characters and the like). According to this conventional method, a variegated character is formed through the steps of; organizing the dot-decomposed character data so that the coordinate at which the dot that defines the edge of the character changes from white to black or vice versa along the direction of the scanning line is increased or decreased in the direction of the scanning line, organizing the same dot-decomposed data in the same manner otherwise in the direction perpendicular to the direction of the scanning. At this point, the conventional process take a logical sum or logical product between both the above organized data and carrying out a logical operation between the data and the dot-decomposed character data. In other words, the conventional variegation process is to move the contour coordinates of the dot-decomposed character upward or downward, or right or left (refer to Japanese Patent Laid-open No. 145986/ 1983).

However, the above mentioned processing method can be applied only to a character, which has contour coordinates that can be easily extracted. It is impossible to apply this method to image data represented in a bit map format.

In order to solve the limitations of the above discussed method, Japanese Patent Laid-open No. 68975/1989 (method of shadowing) and Japanese Patent Laid-open No. 315678/1989 (method of square thickening) were proposed by the present applicant. In these methods, when characters are subjected to the operation process such as thickening, shadowing or the like, the character image data is shifted for each picture element up and down and right and left in order to repeatedly write in the data by performing logical sum operations. A character thickened by this method as shown, for example, in FIG. 25A, has a characteristic that the thickness of the contour of a character differs, the portions of a character, between the straight portion and the curved portion, and that the character tends to exhibit an angular appearance. Further, high speed processing by this method is limited only to thickening a character angularly as shown in FIG. 25A and it is difficult to apply this method at a high speed in order to thicken a character which is to be rounded as shown in FIG. 25B. Consequently, there is a great need for a new processing method by which the binarized image can be thickened with roundness and shadowed at a high speed.

SUMMARY OF THE INVENTION

This invention has been achieved in consideration of the above discussed circumstances and, accordingly, an object of this invention is to provide an image processing method by which the operation process such as thickening characters and the like is effectively carried out at a high speed.

According to one embodiment of this invention, there is provided an image processing method by which an image is thickened or shadowed, comprising the steps of forming a unit data for thickening or shadowing and storing the same, generating a contour image of image data read from an image and reading the unit data to be written onto the position of the image of said image data to which each contour picture element on said contour image corresponds.

According to another embodiment of this invention, there is provided an image processing method by which an image is thickened or shadowed, comprising the steps of forming synthetic unit data for thickening or shadowing for each bit pattern consisiting of a plurality of bits and storing them, generating a contour image of image data corresponding to image and reading out the synthetic unit data to be written onto that position on the image of said image data to which each unit consisting of a plurality of contour picture elements on said contour image corresponds.

The nature, principle and utility of the invention will become more apparent from the following detailed description when read in conjunction with the accompanying drawings.

BRIEF DESCRIPTION OF THE DRAWINGS

In the accompanying drawings:

FIGS. 3A to 3D and FIGS. 4A and 4B are diagrams for explaining the synthetic unit data for use in this invention, respectively;

FIGS. 14A to 14C are diagrams for illustrating the reason for adding black lines at the top and the bottom during the contour transformation;

FIG. 15 is a diagram for explaining the one-line overlapping treatment;

FIG. 20 is a diagram showing the feature of writing in the synthetic unit data when the operation is performed following to the flow chart shown in FIG. 19;

DESCRIPTION OF THE PREFERRED EMBODIMENTS

Figure 1:
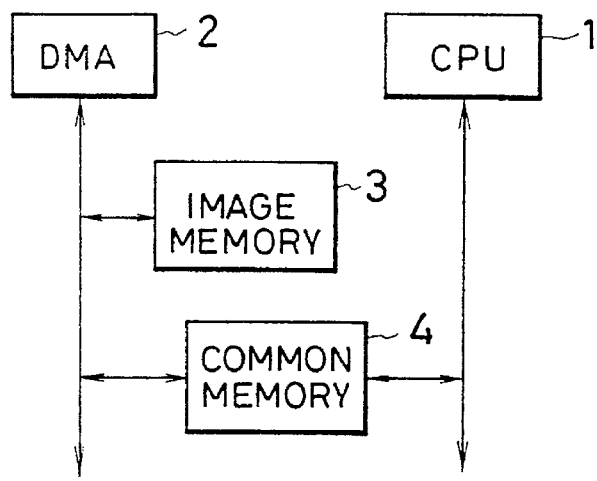
FIG. 1 is a block diagram showing the apparatus for realizing the method of this invention.

FIG. 1 shows an example of an apparatus utilized in the method of this invention. In this figure, a CPU 1 which controls the whole system according to the program and a DMA (Direct Memory Access) unit 2 connected to an image memory 3 are both adapted to be able to access to a common memory 4.

Figure 2A:
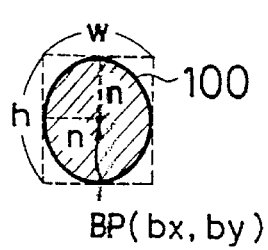
FIGS. 2A to 2C are views showing examples of the unit data.
Figure 4A:
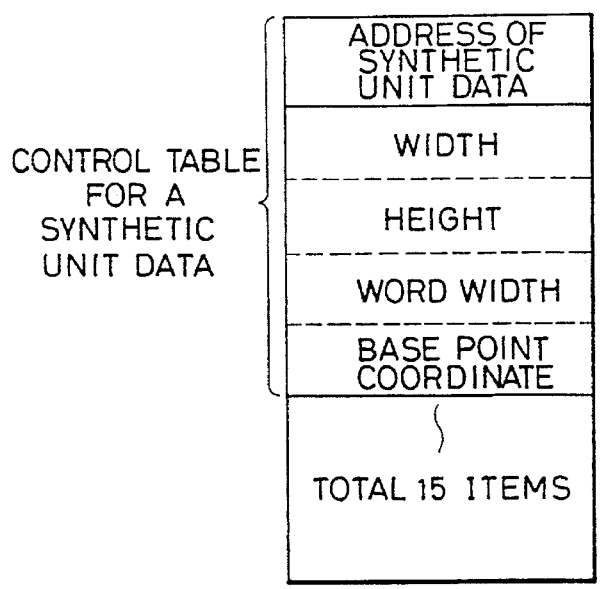
Figure 4B:
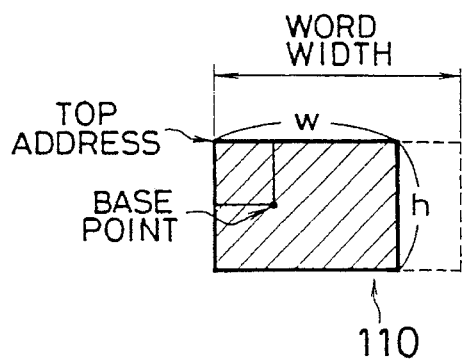

First, the way of generating unit data and synthetic unit data for use in this invention will be explained. The unit data and the synthetic unit data are composed of bit map data to be written onto the image data along the contour of the contour image when a character is subjected to the a thickening (thining) or a shadowing process, and are to be prepared in advance. When a character is thickened, for example, by n picture elements as a unit, at first a unit data 100 as shown in FIG. 2A is to be prepared, which is formed by a bit map of a solid circle having a diameter of n. Here, $w=2n+1$, $h=2n+1$ and the coordinate $(bx,by)$ of the base point BP is represented by $bx=n$, $by=n$. Such a unit data will correspond to a single bit of the bit pattern in the practical processing. However the CPU 1 is less effective, so that the data cannot be treated by every sigle bit one by one. To compensate for the lack of efficiency of the CPU 1 in this invention, the image memory 3 is adapted to keep the previously prepared synthetic unit data 110 for every bit pattern consisting of 4 bit pattern (0 to F, "0000" to "1111") as shown in FIGS. 3A and 3B, which represent the synthetic unit data corresponding to bit map patterns "1010" and "1001", respectively. A synthetic unit data 110 is formed by the format specification as shown in FIG. 4B in relation to the bit pattern having four bits, and is stored in the image memory 3 as having a control table as shown in FIG. 4A.

Figure 2B:
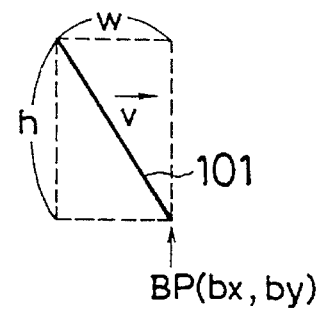
Figure 2C:
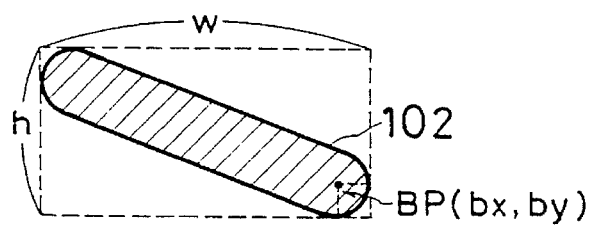

In order to deal with the case of forming a character with a shadow represented by $(x,y)$, a unit data 101 formed by a line segment bit map (the line width is to be equal to 1) is to be prepared as shown in FIG. 2B. Here, $w=|x|+1$, $h=|y|+1$, $\vec{v}=(x,y)$, and the coordinate $(bx,by)$ of the base point BP will be determined as: if $x>0$, then $bx$="0" otherwise $bx$="$-x$", and if $y>0$, then $by$="0" otherwise $by$="$-y$". In addition, in order to thicken a character by n picture elements and form a shadow $(x,y)$ simultaneuously, a unit data 102 is to be prepared which is formed by a solid circle having an n-picture element diameter with a shadow $(x,y)$ as shown in FIG. 2C. Here, $w=2n+|x|+1$, $h=2n+|y|+1$, and the coordinate $(bx,by)$ of the base point BP will be determined as: if $x>0$, then $bx$="n" otherwise $bx$="$-x+n$", and if $y>0$, then $by$="n" otherwise $by$="$-y+n$". In the same manner as before, also in relation to these unit data 101 and 102, the synthetic unit data as shown in FIGS. 3C and 3D are to be prepared so as to be stored in the image memory 3 in the form of the control table including the relation as shown in FIGS. 4A and 4B.

Figure 22:
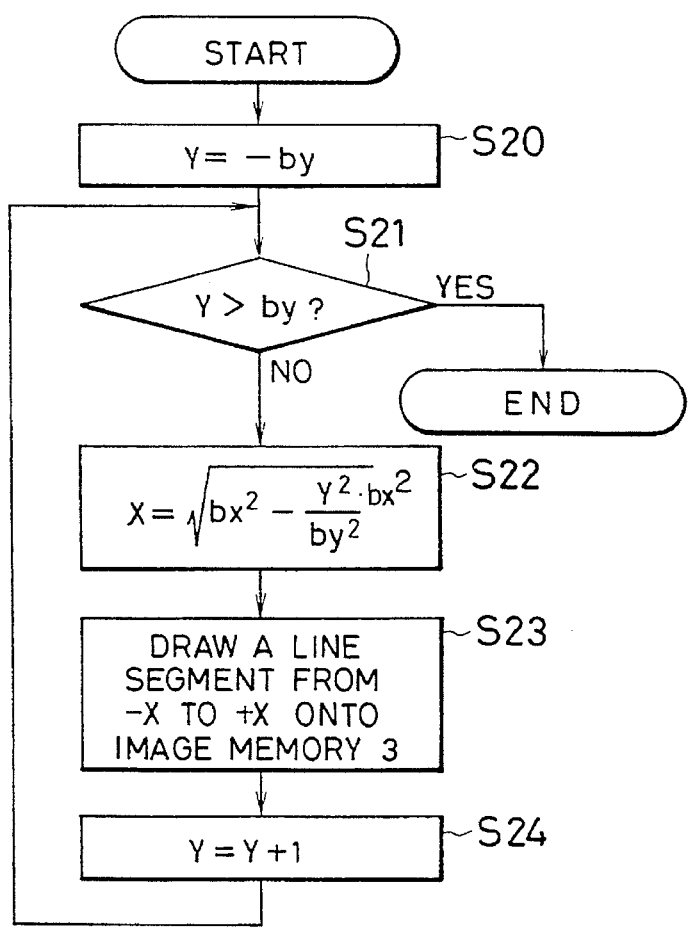
Figure 24:
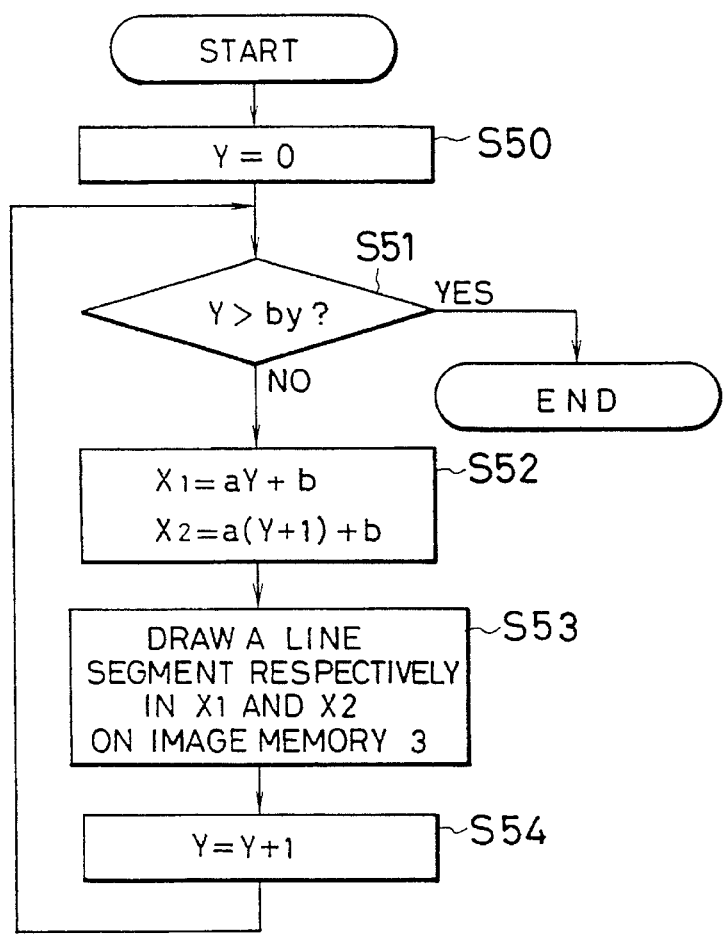

A detailed description of a generating method of the unit data 100 and 101 is presented below with reference to the flow charts shown in FIGS. 22 and 24.

Figure 21:
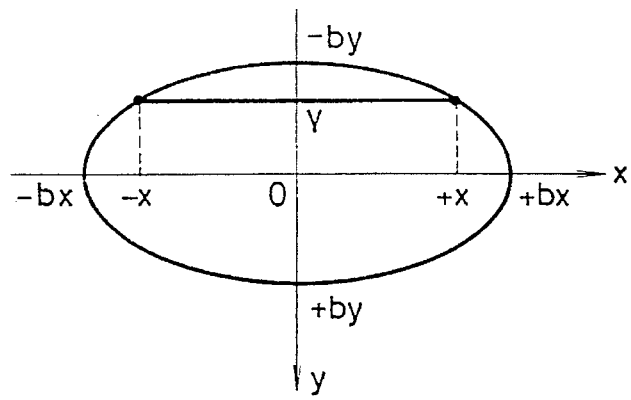
FIGS. 21 to 24 are diagrams for illustrating the method of forming the unit data.

A generalized form of the unit data 100 is represented by an ellipse $X^2/b_x^2+Y^2/b_y^2=1$ as shown in FIG. 21. For first step, $Y=-by$ is set up (Step S20), then a judgement as to whether $Y>by$ or not is made (Step S21). If this condition is satisfied, then the operation is to be completed, and otherwise the X-coordinate value is calculated by the expression $X=\sqrt{b_x^2 \cdot (Y^2 \cdot b_x^2/b_y^2)}$ (Step S22) and a line is drawn onto the image, memory 3 between $-X$ and $+X$ by means of the DMA unit 2 (Step S23). Subsequently, Y is renewed to "Y+1" (Step S24) to be followed by returning to the aforementioned Step S21. This process will be repeated until Y becomes larger than by $(Y>by)$, and thus making it possble to prepare the unit data 100.

Figure 23:
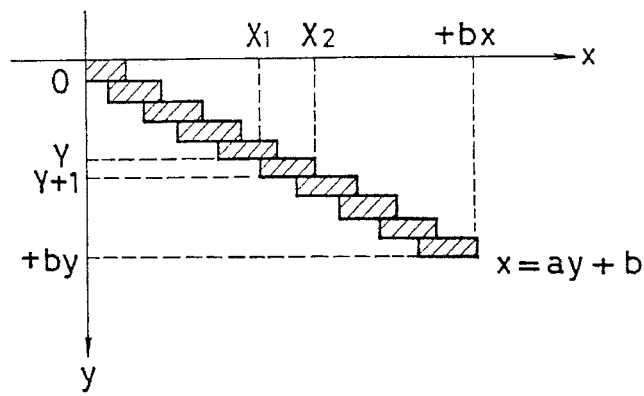

On the other hand, the unit data 101 is represented by the function $x=ay+b$ as shown in FIG. 23. At first, $Y=0$ is set up (Step S50), then a judgement as to whether $Y>by$ or not is made (Step S51). If this condition $Y>by$ is satisfied, then the operation is to be completed, otherwise, the calculations $X_1=aY+b$, $X_2=a(Y+1)+b$ are carried out (Step S52), to draw onto the image memory 3 a line ($X_1$ to $X_2$) as shown in FIG. 23 by means of the DMA unit 2 (Step S53). Subsequently, Y is renewed to "Y+1" (Step S54) to be followed by returning to the aforementioned Step S51. This process will be repeated until Y becomes larger than by $(Y>by)$, and thus making it possible to prepare the unit data 101.

Now, there will be a description detailed for the reservation and initialization of the work area on the image memory 3 for the contour trace processing.

Figure 5A:
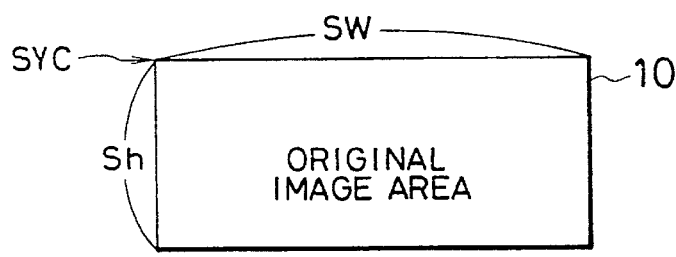
FIGS. 5A and 5B are diagrams for explaining the reservation and initialization of the work area.
Figure 5B:
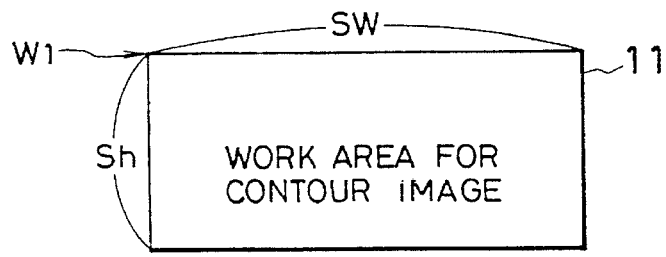

At first, two kinds of work areas are reserved as an original image area 10 as shown in FIG. 5A and a work area 11 for contour image as shown in FIG. 5B. In this case, the size of the original image is defined by sw×sh. It should be noted that the address of the original image area 10 is represented by "src" and that the address of the contouring work area 11 is represented by "w1". Secondly, the original image is reproduced in the address w1 on the work area 11 to be transformed to the contour bit map composed of single picture element. The contour bit map composed of the single picture element will be generated in the manner comprising the following steps ① to ⑤.

① In order to reproduce the reverse image of the work area 11, a work area A (not shown) having a same size with the work area 11 is reserved (the address is represented by w2).

② A logical sum (OR) between the respective data prepared by shifting the content of the work area A right and left by one bit picture element is operated to be written in onto the work area A.

③ A logical sum (OR) between the respective data prepared by shifting the content of the work area A upward and downward by one bit picture element is operated to be written in onto the work area A.

④ A logical operation exclusive OR between the work area A and the work area 11 for contour image is performed and the negative of the resultant is written in onto the work area 11.

⑤ The area of the work area A is to be freed.

Figure 6:
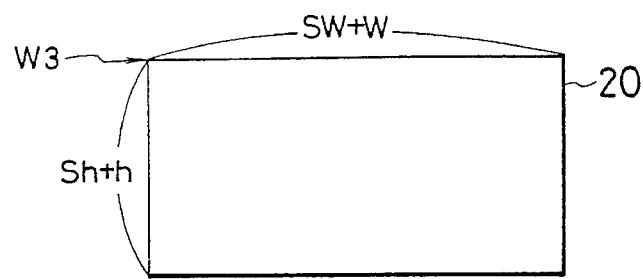
FIG. 6 is a schematic diagram explaining the way of writing in the synthetic unit data.

On the other hand, in connection with the work area to which the unit data is written in, a work area 20 is reserved as shown in FIG. 6 and cleared or initialized in order to write in the unit data thereto according to the bit map above-generated in the work area 11 for contour image. The address of the work area 20 reserved is adapted to be represented by w3. The w and h respectively denote as mentioned hereinbefore the width and the height of the unit data 102.

Figure 7:
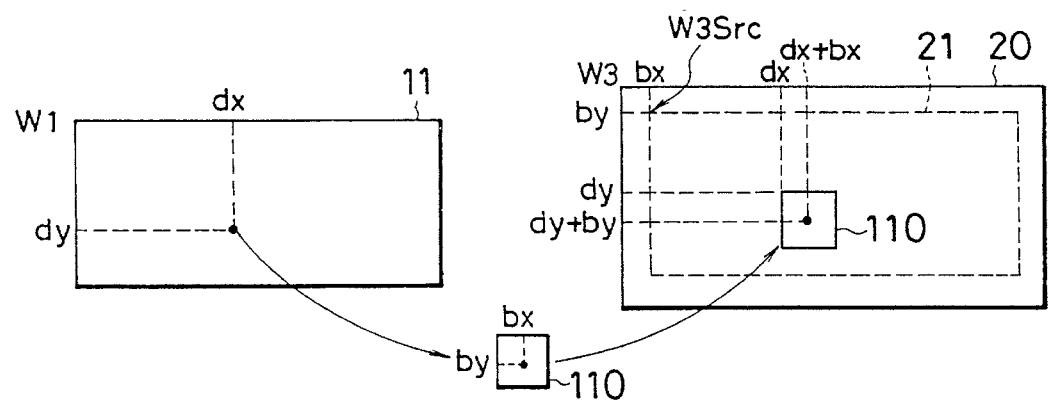
FIG. 7 is a shcematic diagram for explaining the method of the contour trace.

Next, the way of the contour trace will be described with reference to FIG. 7. The contour trace opearation step is performed by the following procedure;

ⓐ Picture elements are read out sequentially from the work area 11 (w1). Now, it is assumed that a picture element indicated by (dx,dy) is read out and the value of the bit is to be represented by "b".

ⓑ If b=0, the treatment to that picture element is not performed. If b=1, the unit data is read out to be written in (by logical sum) in such a manner that the left-uppermost picture element of the unit data may correspond to the position (dx,dy) on the work area 20 for the unit data being written in.

ⓒ The above operations ⓐ and ⓑ will be performed to every picture elements on the work area 11 for contour image.

As a result of the above operation steps ⓐ to ⓒ, in the inner part (more specifically, it is a region having an area of sw×sh which left-upper point corresponds to the point deviated by (bx,by) from the upper-left reference point of the work area 20 ) of the work area 20. The bit map data is to be left to which the unit data have been written in by logical sum along the contour on the work area 11.

In the final processing step of the contour trace processing, the data generated in the operation steps ⓐ to ⓒ on the operation region 20 is written in to the original image area 10 (the position wherein the address is denoted by "src") so as to work on the original image data. Here, the area 21 (the address is denoted by "w3src") surrounded by the inner broken line in the work area 20 is the only one to be written in. Then, it should be noted that the logical operation performed for writing in is different depending upon the type of the processing, for example, when the operation of thickening or shadowing is to be made, the logical sum "the region (w3src) OR the original image area 10 (src)" will be performed. In the case of the thining, "the original image area 10 (src) AND the negate $\overline{(w3src)}$ of the area 21" will be operated. After this final processing step, the original image area 10 and the work area 20 both used for the aforementioned various steps is released for the other purpose, thus completing the contour trace processing.

Figure 8:
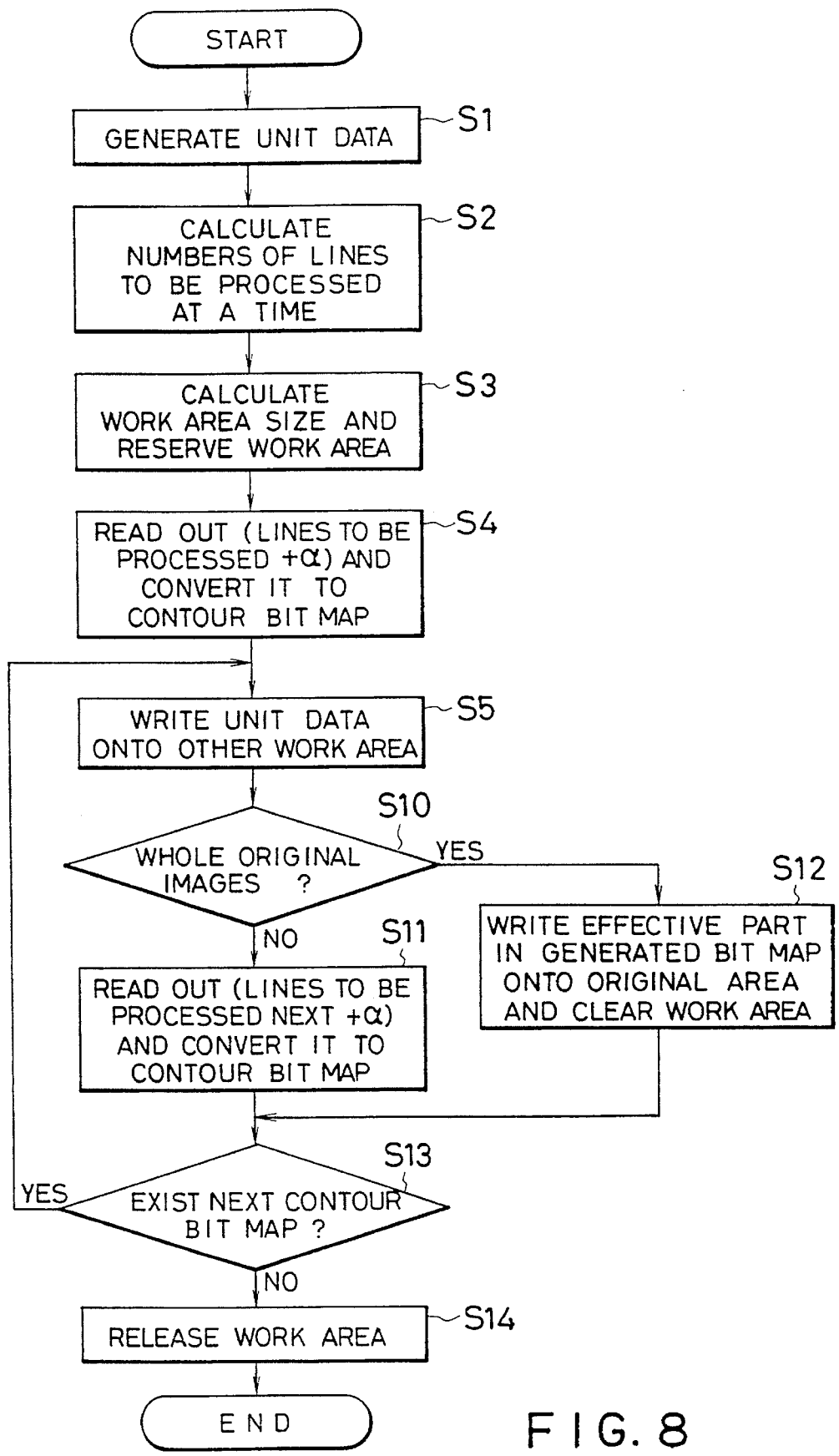
FIG. 8 is a flow chart showing an operational example of the divisional processing treatment in this invention.

In the contour trace processing detailed above, there is needed for the work area a little more than two times region the original image area 10 has occupied. Therefore, if the original image area 10 is large, too many numbers of memories are disadvantageously to be employed. To eliminate this defect, the processing treatment of this invention is to be performed by dividing or segmenting the original image. With reference to the flow chart shown in FIG. 8, there will be explained the divisional processing treatment. At first, the unit data 110 as described above is prepared and stored (Step S1). Secondly, the number of the lines to be processed at a time in the divisional process is calculated (Step S2). More specifically, when the size of the work area for use in the usual processing is indicated by WORKAREASIZE, the number of the lines will be calculated as follows;

l:=(WORKAREASIZE)/SWW (SWW; word width of the original image data, i.e., the number of the words on one line) if l>sh, then the number of the lines:=sh else if l>|dy|, then the number of the lines:=l else the numbers of the lines:=|dy|+1 (dy; y-direction component of thickening or shadowing)

Figure 9:
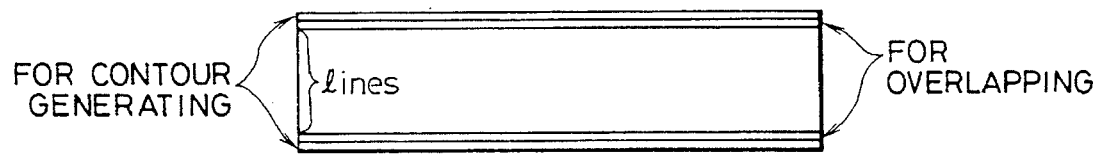
FIG. 9 is a schematic diagram explaining the treatment of the contour area.

Next to this, the size of the work area is calculated based on the numbers of the lines figured in the Step S2 so as to reserve a couple of work areas for the original image area 10 and the contouring work area 11 (Step S3). In the work area 11 (the contour area), it is necessary to consider not only the number (lines) of the lines to be processed but also the number of lines to be processed next. It should be also noted that the number "lines" of lines is the one that is calculated in the Step S2. In order to correctly process the boundary part occurred in the overlapping division for the the boundary part treatment required for the division, it is necessary to add one line for overlapping treatment respectively to the top and the bottom of the lines in question. In addition, in order to avoid performing a needless contour process such as forming a contour for the boundary part, it is necessary to add one more line respectively to the top and the bottom of the same lines. In this reason, the number of the lines in the contour area has, as shown in FIG. 9, four more lines in all (two lines each at top and bottom) than the lines to be processed originally. Further, the processing area is required to have more lines than those to be practically processed by the number of the lines corresponding to the height of the unit data. As mentioned before, in the case of the division process being performed, since it is necessary to process the extra lines for overlapping, the number of the lines to be processed in practice is to be "lines +2". Consequently, the number of the lines in the processing area is needed to be "lines+2+h"

Figure 10:
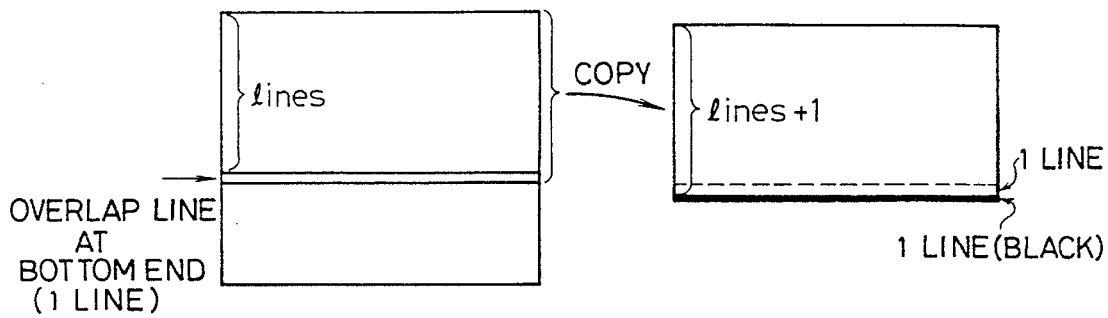
FIGS. 10 to 12 are diagrams for explaining the method of the contour bit map transformation.
Figure 11:
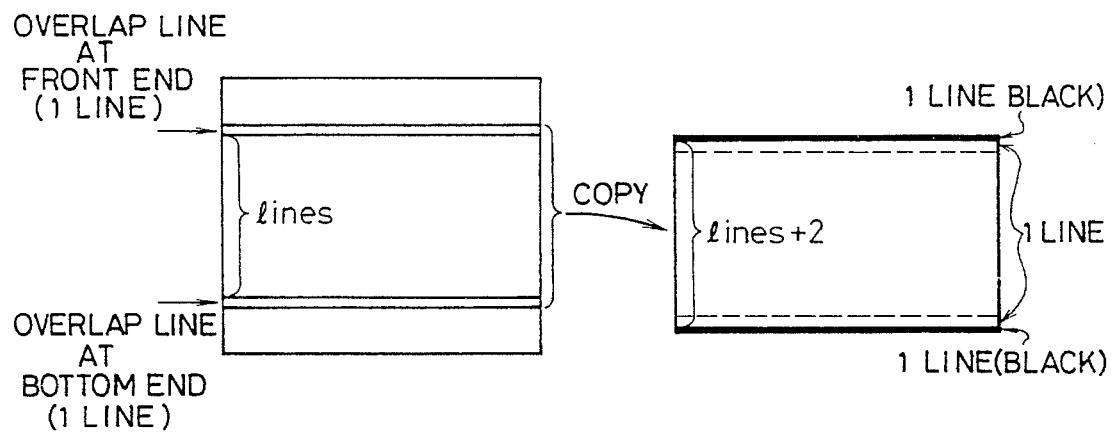
Figure 12:
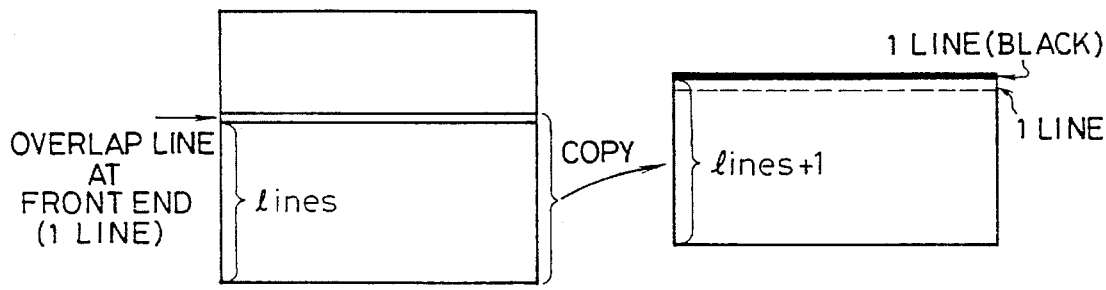

Next, the data composed of lines to be processed plus α (to be considered for the overlapping at the top and the bottom) is read out of the original image area 10 to be converted to the contour bit map (Step S4). More specifically, when the lines to be processed are read out of the original image area 10 to be converted to the contour bit map, there will be three kinds of patterns depending upon the number of the lines and the position to which the data is read out. First, in the case where an area from the top to the line "lines" is to be processed as shown in FIG. 10, the contour conversion is performed by "lines+2". In the second case as shown in FIG. 11, where an inner area having the line lines is to be processed, the contour conversion is performed by "lines+4". The last pattern is as shown in FIG. 12, of the line lines including the last line. In this case, the contour conversion is performed by "lines+2".

Figure 13:
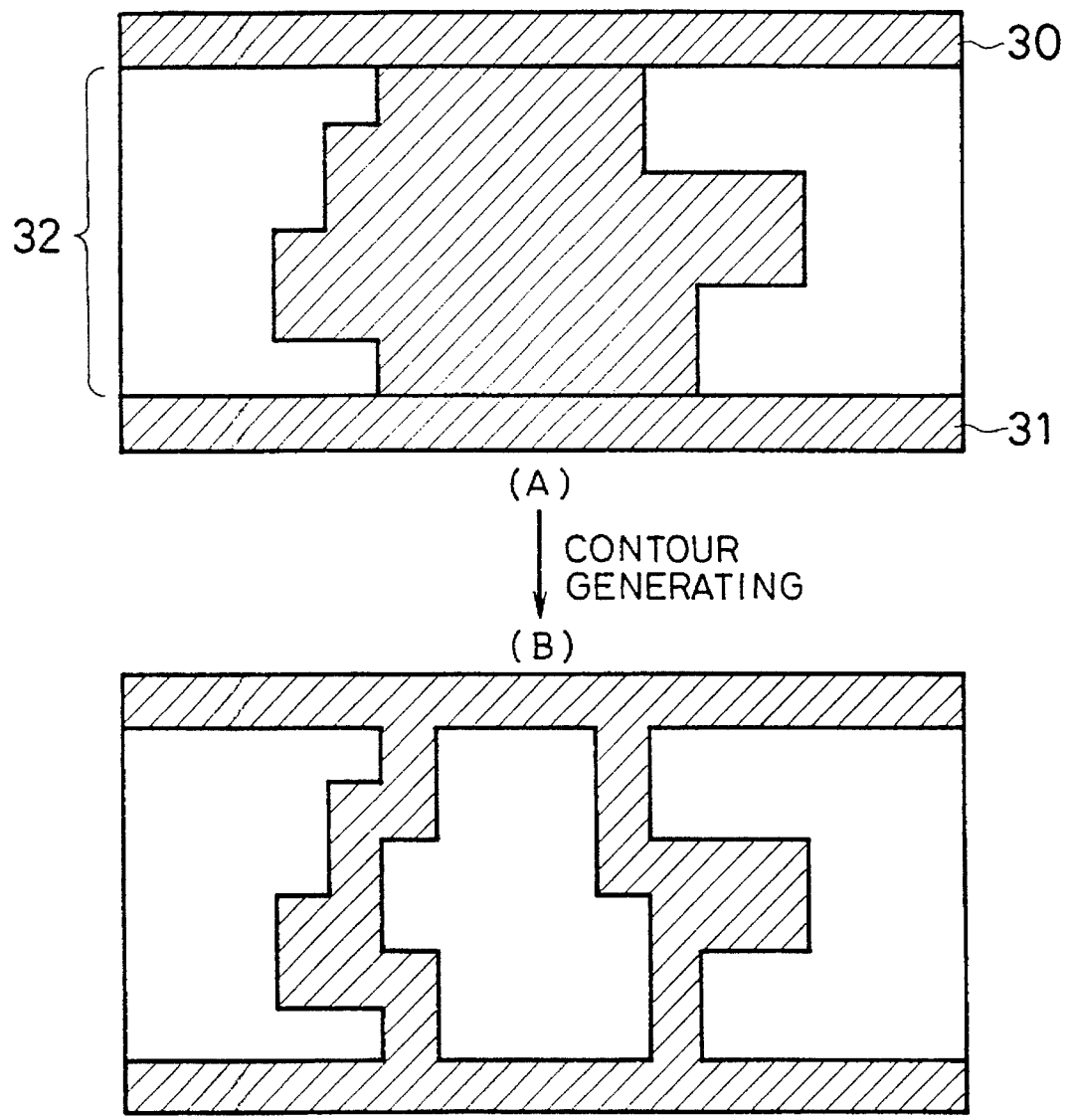
FIG. 13 is a diagram for explaining the contour generating.
Figure 16:
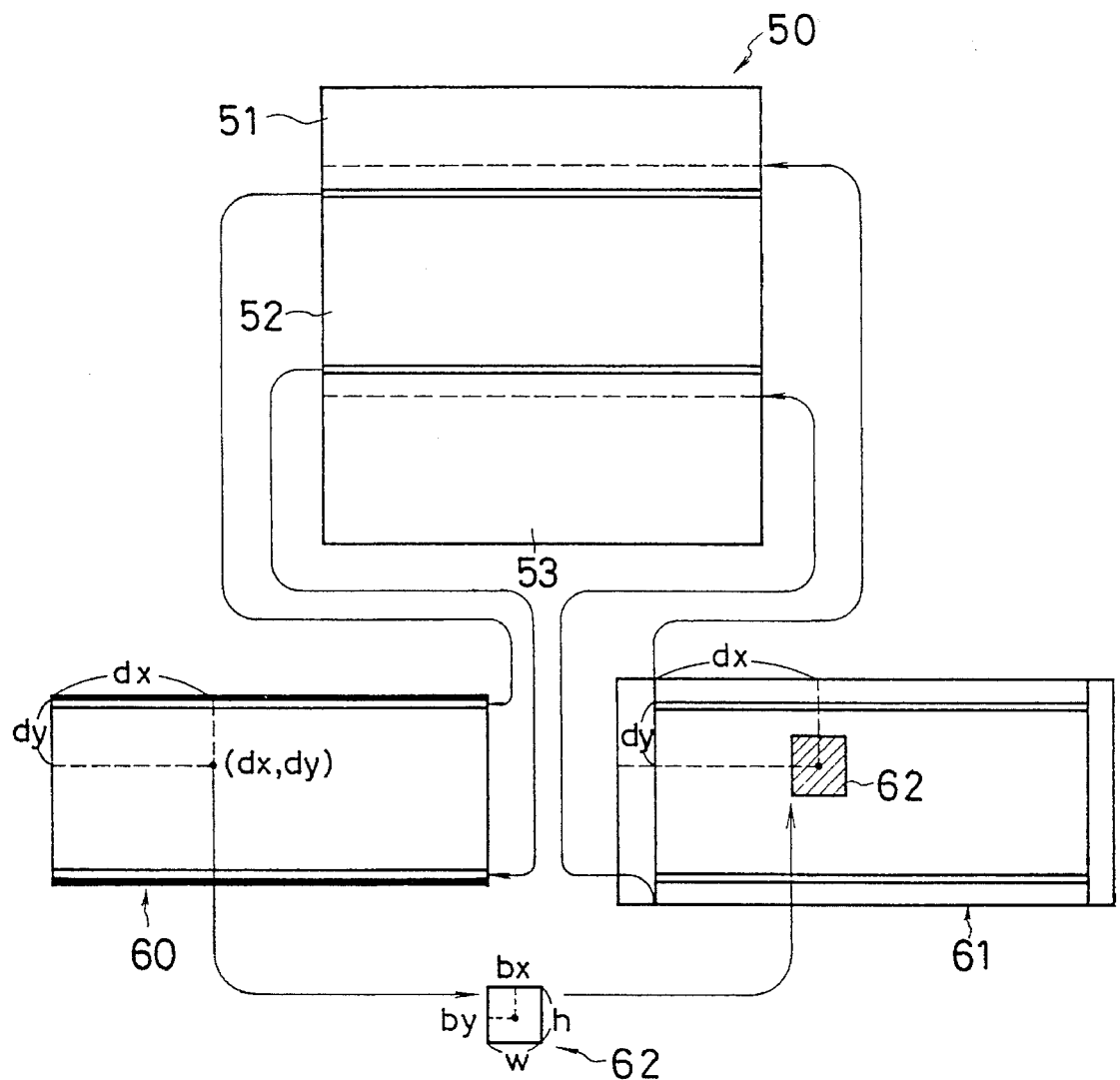
FIG. 16 is a diagram for explaining the method of writing in the synthetic unit data.

On the other hand, by annexing black lines 30 and 31 at the top and the bottom respectively as shown in FIG. 13A, it becomes possible to prevent the both boundary lines at both the top and the bottom from forming as contours on the original bit map 32 as shown in FIG. 13B.

Further, according to this invention, the contour conversion is carried out with respect to the lines including both of the black lines at the top and the bottom, while the unit data is written in without reading those black lines at the top and the bottom. This makes it possible to save an unnecessary treatment when a black portion extends across the division boundary. For example, in the case where a bit map as shown in FIG. 14A is divided by a broken line 40, both of the divided portions generate respective contours 41 and 42 as shown in FIG. 14B. In this case, if the unit data 102 is written in along the contours 41 and 42, the line section 43 which is not to exist as a contour will also occur defectively. Therefore, by annexing black lines in the contour conversion process, it is possible, as shown in FIG. 14C, to save the unnecessary contour processing. Even in this case, an unnecessary process for some picture element should not be saved because of the overlapping treatment in relation to the portion 44.

In contrast, if the overlapping treatment is not carried out in the dividing process, and if an unnecessary contour treatment is saved to be effected, there will disadvantageously be unprocessed contours existing. In the other case, if a contour is generated for each divided unit, an unnecessary contour treatment is required although the method is creditable. Accordingly, for the optimum method, the one-line overlapping treatment will be performed.

After the conversion of the contour bit map is carried out as stated above, the unit data is written in by means of the logical sum along the contour bit map onto the other work area (Step S5). In the dividing process, the data read out after the contour conversion is composed of lines from which the top and bottom lines have been removed. Even in this case, it may also happen that the read-out lines includes one over-lapping line each at the top and the bottom. FI6. 16 shows the relationship between the original image 50, the contour area 60 and the processing area 61. In this figure, the original image 50 is divided into three divided areas 51 to 53, and the unit data 62 is to be written in onto the processing area 61. The data in the processing area 61 is shown to be written in under the operation of the logical sum onto the divided area 52 of the original image 50. Next, a judgement is made as to whether all original images have been completely read out or not (Step S10), if so, the effective portion in the bit map generated in the Step S5 is written in onto the original image area 10, then this the work area is to be cleared (Step S12). If the original images are still left, the lines including the lines to be processed next of the original image and the plus α lines are read out to be transformed to the contour bit map (Step S11).

After the above process, whether or not the next contour bit map to be processed exists in the work area is to be judged. (Step S13), if it exists, the procedure is followed by returning to the Step S5. If it does not exist, the work area is to be freed to be completed (Step S14).

Figure 17:
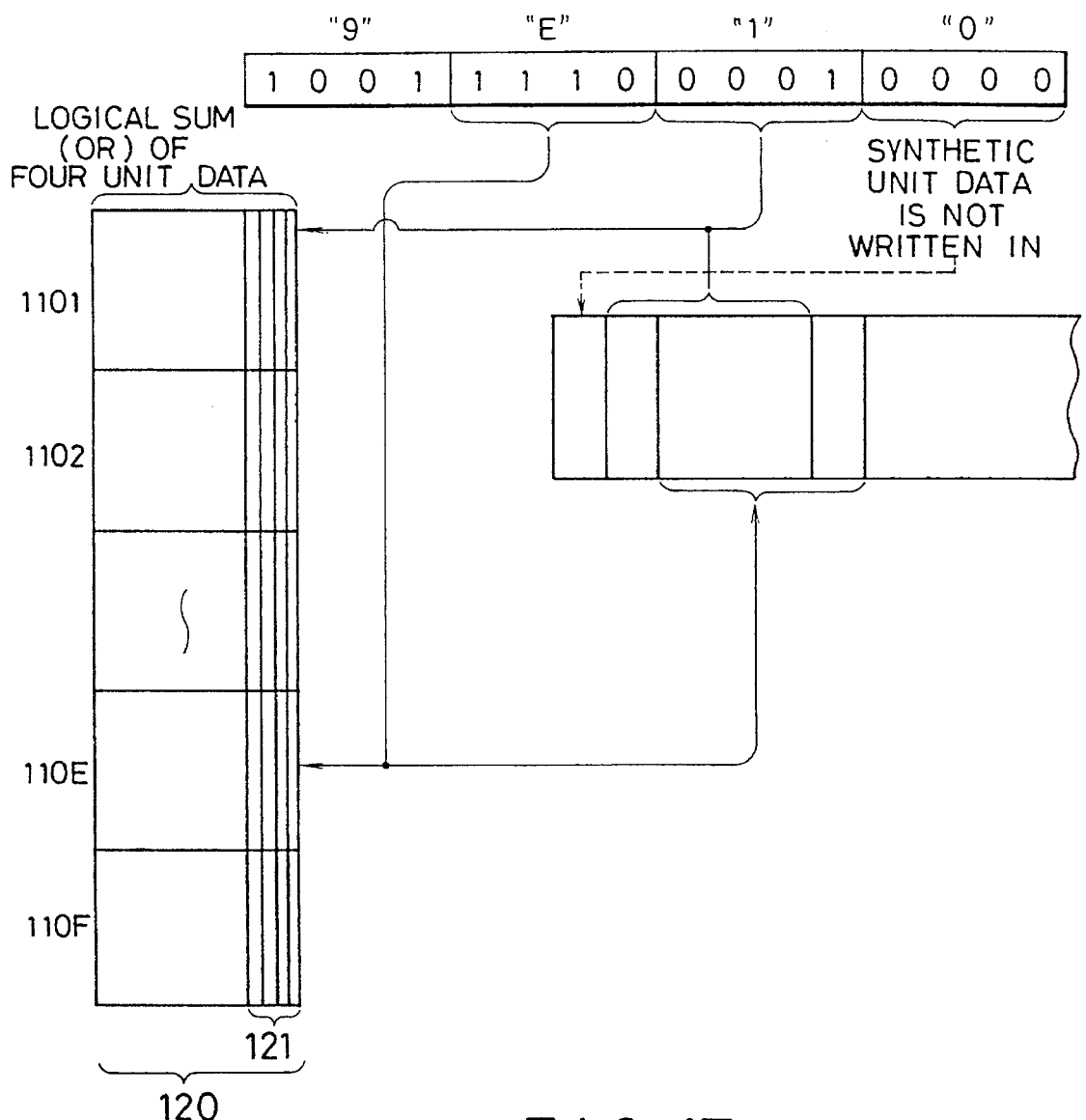
FIGS. 17 and 18 are diagrams for explaining the feature of writing in the synthetic unit data.

When the operation of writing in the unit data (100 to 102) onto the position wherein on the contour data has black elements is effected by checking up the picture elements of the contour data one by one so as to judge whether the picture element is black or white, this will deteriorate the processing speed. To avoid this, it is necessary to reduce the picture element reading-out frequency as much as possible because an usual CPU reads out data by treating a single byte or a single word as a unit. For this reason, in this invention, the reading-out of the picture element is effected by treating a plurality of picture elements (for example, four picture elements) as a unit, and the unit data is also adapted to be written in at a time by preparing a synthetic unit data for four picture elements as a unit. FIG. 17 shows this feature. Here, there are, for example, fifteen (0 to F) synthetic unit data 1101 to 110F (120) prepared. The region 121 shows the feature of preparing a synthetic unit data by shifting the picture elemnts one by one. The synthetic unit data 110E and the synthetic unit data 1101 are read out in order to be written in respectively onto the contour data E (1110) and the contour data 1 (0001).

Figure 18:
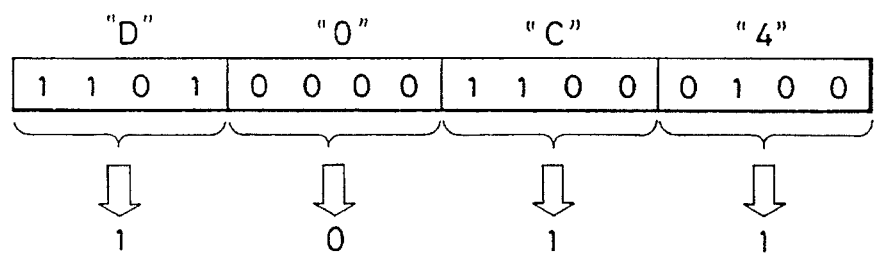

On the other hand, 4-bit picture element treatment makes it possible, without degrading the image quality, to perform the process at a high speed as detailed hereinafter. In practice, in the case of the single bit element treatment, it is necessary to write in fifteen kinds of the synthetic unit data in 4-bit unit. However, for the 4-bit picture element treatment, it is possible to write in fifteen kinds of the synthetic unit data in 16-bit unit (corresponding to 4 picture elements). More specifically, a 16-bit is divided into four 4-bit picture elements, and only when all bit of a 4-bit picture element are equal to "0", "0" is allotted to the 4-bit picture element, otherwise "1" is allotted. This enables four 4-bit picture elements to be represented by four bits. In the case of a 16-bit pattern as shown in FIG. 18, it is represented by "1011". When a pattern is represented by "0000", no unit data is written in. When a patten is represented by other than "0000", a synthetic unit data is written in, being selected from the previously prepared fifteen kinds of the synthetic unit data.

Figure 19:
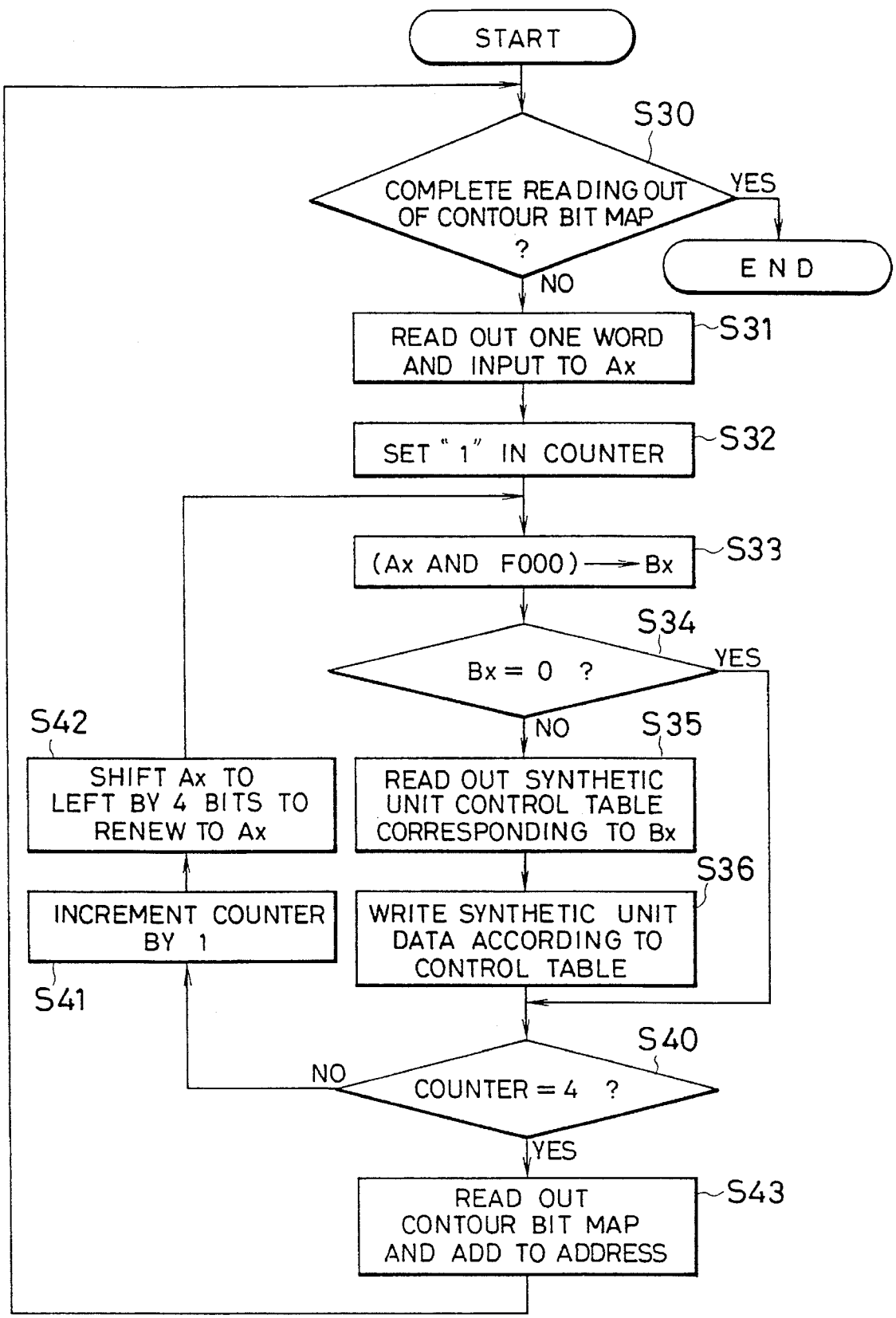
FIG. 19 is a flow chart showing an operational example in practice.

Next, how the practical examination of the contour bit map is effected will be detailed with reference to the flow chart shown in FIG. 19. At first, a judgement on whether the contour bit map has been completely read out is to be made by means of the CPU 1 (Step S30), if it is completed, the operation will be completed. If not, as shown in FIG. 20, a one-word data (16 bits) is read out to be stored in a register Ax (Step S31). Secondly, a counter is set up to be "1" (Step S32), a logical operation AND is performed between the register Ax and the bit map data F000 ("F000" in hexadecimal notation), the resultant is stored in a register Bx by shifting to the right by tweleve bit picture elements (Step S33). Then, whether the relation Bx=0 is satisfied or not will be examined. If the register Bx is not equal to zero, the synthetic unit data corresponding to the data registered in the register Bx is extracted from the control table 120 (1101 to 110F) (Step S35), and the unit data determined according to the control table is written in to the work area 20 as shown in FIG. 20 (Step S36). After this, the counter will be raised by "+1" until the value of the counter is equal to be "4" (Step S41). The content of the register Ax is shifted to the left by four bit picture elements and the resultant is to be restored in the register Ax (Step S42). Then, this step is followed by the return to the Step S33 to repeat the above operations (Step S40). When the counter value is equal to "4", the contour bit map is read out to add "2" to the address because a one-word is composed of 2 bytes (16 bits). Then, this step will be followed by returning to the above Step S30.

As detailed above, according to the method of this invention, the processing time for thickening or shadowing a character is determined by the sum, that is, the contour generating time+the contour reading-out time+the unit writing-in time. The sum of the former two terms is memory transformation time of ten times of the original image. Accordingly this time is shortened less than one-tenth of the conventional processing time. While the last term is in proportion to the total length of the contour, generally, if the image is composed of binary images, it is roughly in proportion to the peripheral length of the rectangle image. There is little dependency upon the kinds of the image such as a high quality image having a large amount of data or the like.

Figure 25A:
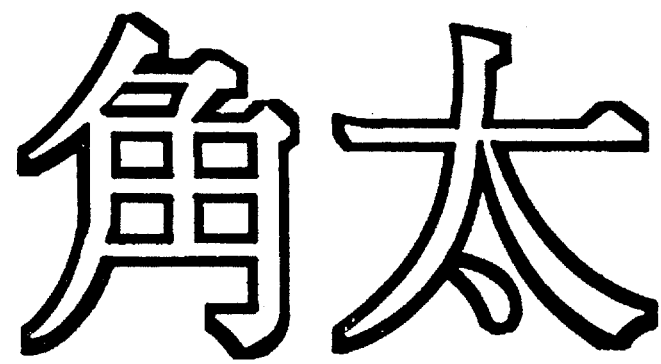
FIGS. 25A and 25B are diagrams for comparingly showing the difference in thickening a character between by the conventional method and the method of this invention.
Figure 25B:

In addition, the thickening operation of the character in accordance with this invention is formed rounded as shown in FIG. 25B, and surpasses from the artistical point of view the conventional method shown in FIG. 25A.

It should be understood that many modifications and adaptations of the invention will become apparent to those skilled in the art and it is intended to encompass such obvious modifications and changes in the scope of the claims appended hereto.

What is claimed is:

1. An image processing method for use in an image processing apparatus for thickening or shadowing an image, said method comprising the steps of: generating and storing in a memory unit data for one of thickening and shadowing, said unit data being representative of characteristics of a thickening or shadowing process; generating a contour image by copying a reverse image of said image in a first memory location to a second memory location, shifting said reverse image to the left or right by one bit pixel to produce a first image, performing a first logical sum (OR) between said first image and said reverse image to produce a second image, shifting said second image to the right or left by two bit pixels to produce a third image, performing a second logical sum (OR) between said second and third images to produce a fourth image, preforming a third logical sum (OR)

between said fourth image shifted upward and downward by one bit pixel and said fourth image to produce a fifth image, performing a logical exclusive-OR between said fifth image and the image in the first memory location to produce a sixth image, reversing said sixth image to produce said contour image and copying, said contour image into the first memory location; applying said unit data to selected positions on said image corresponding to each contour picture element of said contour image in order to thicken or shadow said image; and outputting said thickened or shadowed image.

2. An image processing method as claimed in claim 1, wherein a plurality of sets of said unit data are prepared to be used for character variations.

3. An image processing method as claimed in claim 2, wherein said sets of unit data are line data and circle shape data.

4. An image processing method as claimed in claim 3, wherein said line data have widths of one of a unit and a plurality units.

5. An image processing method as claimed in claim 1, wherein said reading out step comprises the steps of sequentially reading out picture elements from a contour work area, non-processing the picture element if a flag b=0, reading out the unit data and writing it onto a unit data writing work area if said flag b=1, repeating the above steps for whole picture elements in relation to the remaining bit map data in the contour work area, writing data in the unit data writing work area onto an inner area in an original image area, and releasing the contour work area and the unit data writing work area.

6. An image processing method as claimed in claim 5, wherein said applying step is performed by a logical operation OR performed on said inner area and said original image are if the process is one of boldface and shadowed; and by a logical operation AND performed on the negative of said inner area and said original image area if the process is lightfaced.

7. An image processing method for use in an image processing apparatus for thickening or shadowing an image, said method comprising the steps of: generating and storing in a memory synthetic unit data for one of thickening and shadowing for each bit pattern comprising a plurality of bits which are representative of characteristics of a thickening or shadowing process; generating a contour image, comprising units of picture elements, by copying a reverse image of said image in a first memory location to a second memory location, shifting said reverse image to the left or right by one bit pixel to produce a first image, performing a first logical sum (OR) between said first image and said reverse image to produce a second image, shifting said second image to the right or left by two bit pixels to produce a third image, performing a second logical sum (OR) between said second and third images to produce a fourth image, performing a third logical sum (OR) between said fourth image shifted upward and downward by one bit pixel and said fourth image to produce a fifth image, performing a logical exclusive-OR between said fifth image and the image in the first memory location to produce a sixth image, reversing said sixth image to produce said contour image, and copying said contour image into the first memory location; reading from said first memory location said synthetic unit data; applying said synthetic unit data to selected positions on said image corresponding to each of said units of picture elements of said contour image for thickening or shadowing said image; and outputting said thickened or shadowed image.

8. An image processing method as claimed in claim 7, wherein said synthetic unit data comprises plural bit pattern unit data which are line data or circle shape data.

9. An image processing method as claimed in claim 7, wherein said synthetic unit data are defined by word width, height, front address and a base point and are controlled by a control table in an image memory.

10. An image processing method for use in an image processing apparatus for thickening or shadowing an image, said method comprising the steps of: generating and storing in a memory unit data for one of a thickening and shadowing process; selecting a first partial image by calculating a number of lines to be processed at a time; calculating a size of a first memory location and reserving said first memory location; reading out said number of lines to be processed at a time plus an overlapping constant number of lines; generating a first contour bit map of said lines read by (a) copying a reverse image of said image in a first memory location to a second memory location, (b) shifting said reverse image to the left or right by one bit pixel to produce a first image, (c) performing a first logical sum (OR) between said first image and said reverse image to produce a second image, (d) shifting said second image to the right or left by two bit pixels to produce a third image, (e) performing a second logical sum (OR) between said second and third images to produce a fourth image, (f) performing a third logical sum (OR) between said fourth image shifted upward and downward by one bit pixel and said fourth image to produce a fifth image, (g) performing a logical exclusive-OR between said fifth image and the image in the first memory location to produce a sixth image, (h) reversing said sixth image to produce said first contour image, and (i) copying said first contour image into the first memory location; selecting a second partial image by reading out the next of said number of lines to be processed plus an overlapping constant number of lines if the entire original image has not been processed; generating a second contour bit map in accordance with steps (a)–(i); repeating said steps until the entire of said image has been processed; and outputting said thickened or shadowed image.

11. An image processing method as claimed in claim 10, wherein said calculating step for the work area utilizes a finite number more lines than are to be practically processed, said finite number corresponding to a height of the unit data.

12. An image processing method as claimed in claim 10, wherein said generating said contour bit map includes the step of annexing two black lines at a top and a bottom for an area to generate a contour.

* * * * *